United States Patent [19]
Grundy

[11] 3,824,559
[45] July 16, 1974

[54] DATA PROCESSING APPARATUS FOR WEIGHTING INPUT INFORMATION SIGNALS

[75] Inventor: David Latham Grundy, Saddleworth, England

[73] Assignee: Ferranti Limited, Hollinwood, Lancashire, England

[22] Filed: Aug. 17, 1972

[21] Appl. No.: 281,510

[30] Foreign Application Priority Data

Aug. 18, 1971 Great Britain ............... 38859/71

[52] U.S. Cl. ............... 340/172.5, 235/197, 235/152
[51] Int. Cl. ........................................ G06f 15/34
[58] Field of Search .......... 340/172.5; 235/152, 197

[56] References Cited

UNITED STATES PATENTS

| | | | |
|---|---|---|---|
| 3,519,807 | 7/1970 | Jacques | 235/151.1 |
| 3,614,398 | 10/1971 | Choate | 340/172.5 X |
| 3,626,377 | 2/1971 | Markley | 340/172.5 X |
| 3,633,017 | 1/1972 | Crooke et al. | 340/172.5 X |
| 3,636,337 | 1/1972 | Dietel et al. | 235/197 |
| 3,654,450 | 4/1972 | Webb | 235/197 |

*Primary Examiner*—Paul J. Henon
*Assistant Examiner*—Mark Edward Nusbaum
*Attorney, Agent, or Firm*—Cameron, Kerkam, Sutton, Stowell & Stowell

[57] ABSTRACT

A data processing apparatus is provided for weighting input information signals of varying magnitude each in accordance with a generated function representable by a stepped waveform and stored in a ROM. Each weighted instantaneous magnitude comprises an output of the apparatus.

The magnitude of the information is represented by a train of uniformly spaced pulses and the stepped waveform has unit changes in value at, at least, some of the unit time intervals corresponding to the uniformly spaced pulses. A memory is addressed by the train of uniform pulses and output pulses are obtained for each such train corresponding a unit change in value of the stepped waveform of the generated.

21 Claims, 5 Drawing Figures

DATA PROCESSING APPARATUS FOR WEIGHTING INPUT INFORMATION SIGNALS

Figure 1:
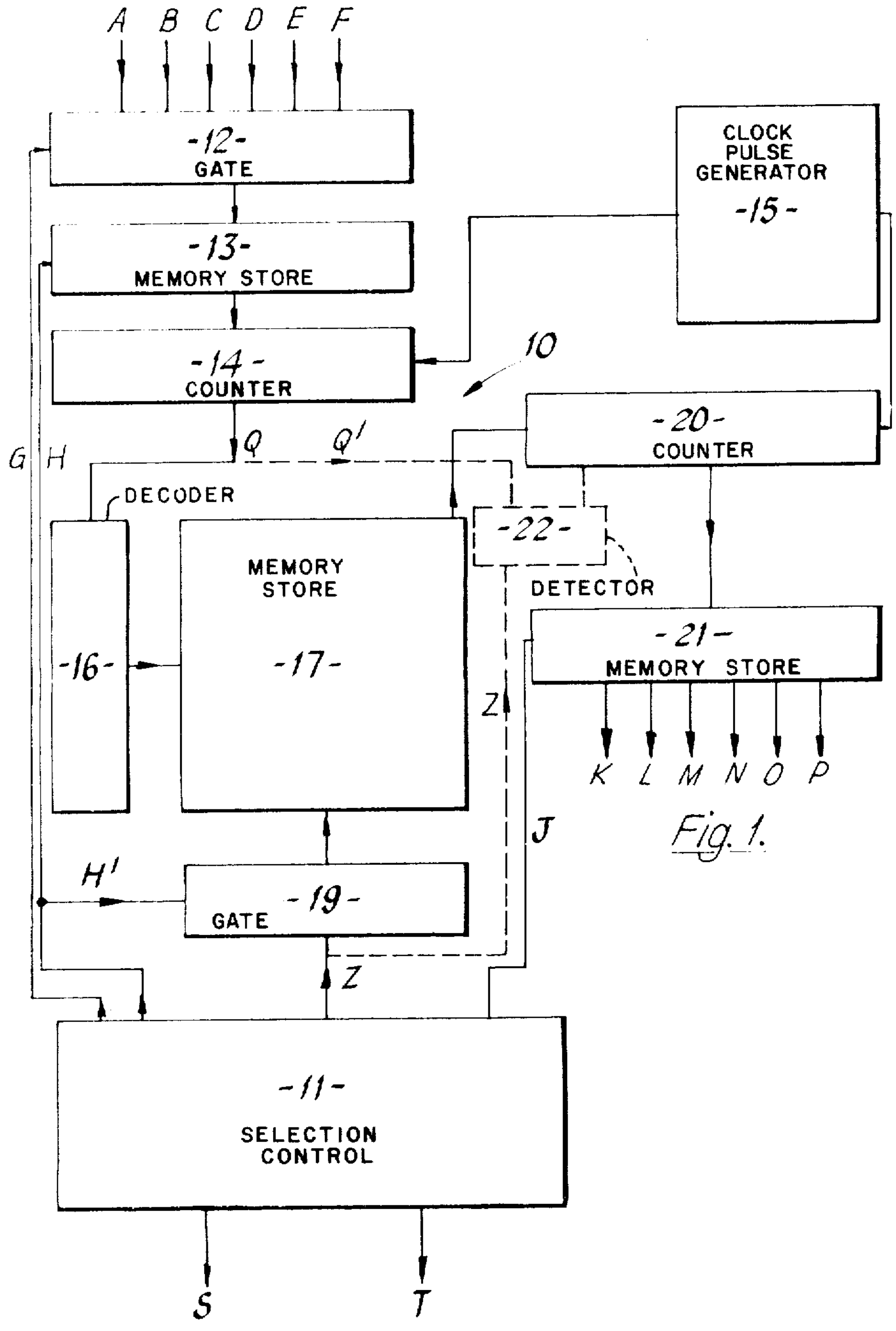

This invention relates to data processing apparatus for weighting the magnitudes of input information signals each in accordance with one of a plurality of different possible functions comprising empirically-derived expressions.

It is an object of the present invention to provide such data processing apparatus which is simple in construction.

The apparatus described in the following specification operates upon input information signals from a plurality of different lines. The magnitudes of the information signal on each line vary sufficiently slowly such that the instantaneous magnitude on a line may be sampled at intervals and weighted in accordance with an appropriate predetermined function by the apparatus. To this end, in one embodiment of the data processing apparatus of the present invention, the memory store and associated decoding means are embodied in a monolithic semiconductor body, with the cells in a read only memory ROM arranged to generate the desired function.

According to the present invention data processing apparatus for weighting an input information signal in accordance with a function representable by a stepped waveform in relation to time, the stepped waveform having a plurality of uniformly spaced points in relation to the time axis, and at least some of the spaced points having at least one unit change in value in relation to the other axis in the required manner to represent the function, comprises means to generate a train of uniformly spaced pulses, each pulse both corresponding to one of the spaced points of the stepped waveform and representing a unit of the magnitude of the input information signal, means to obtain an output pulse in response to each pulse of the train of pulses corresponding to a spaced point of the stepped waveform at which a unit change in valve occurs, an output pulse being obtained for each unit change in valve at that spaced point, and means to accumulate the output pulses.

According to another aspect of the present invention the data processing apparatus includes a memory store having an array of cells with a common output and two series of address lines, each cell being associated with an address line of each series, a first counter arranged such that in response to the accumulation of an input information signal by the first counter there is produced a train of uniformly spaced pulses, different constituent pulses of the train of pulses being produced in response to the accumulation in the first counter of different units of the magnitude of the input information signal and being supplied to at least one corresponding address line of one series of address lines of the memory store, at least one address line receiving a pulse in response to the accumulation in the first counter of at least one unit of the magnitude of the input information signal, a second counter connected to the common output of the memory store, and control means for selecting at least one of the other series of address lines, a plurality of cells forming a predetermined pattern within the memory store, each such cell being capable, when associated with the address line of said other series of address lines selected by the control means and in response to the supply of a pulse of a train of pulses produced by the accumulation of an input information signal in the first counter, of causing the magnitude stored in the second counter to change by at least one unit, the predetermined pattern of cells within the memory store being such that the magnitude accumulated in the second counter comprises the magnitude of the input information signal weighted in accordance with a function associated with the selected address line of said other series of address lines.

Different address lines of said other series of address lines may be associated with different functions.

The sense in which the magnitude stored in the second counter is changed in response to the supply of a pulse to the memory store depends upon the sense of the slope of the function at the point of the function corresponding to the instantaneous value accumulated in the first counter and represented by the pulse.

When the magnitude of different input information signals from a source connected to the data processing apparatus varies, the different magnitudes are weighted to a different extent in accordance with the selected function.

The different functions may be associated with input information signals from different sources, the control means being arranged to control the selection of one of the different sources to be connected to the data processing apparatus.

According to another aspect the present invention at least the array of cells of the memory store may comprise a semiconductor device formed in a semiconductor body the memory store having a common collector region, a different common base region for the cells associated with different address lines of said one series of address lines, and an emitter for each cell of the predetermined pattern of cells within the memory store, different emitters within each common base region being connected to different address lines of said other series of address lines, with corresponding emitters within the different common base regions being connected to the same address line, the different common base regions being connected to different address lines of said one series of address lines, and the common collector region being connected to the common output of the memory store.

Other parts of the data processing apparatus may be provided in the semiconductor body.

Figure 2:
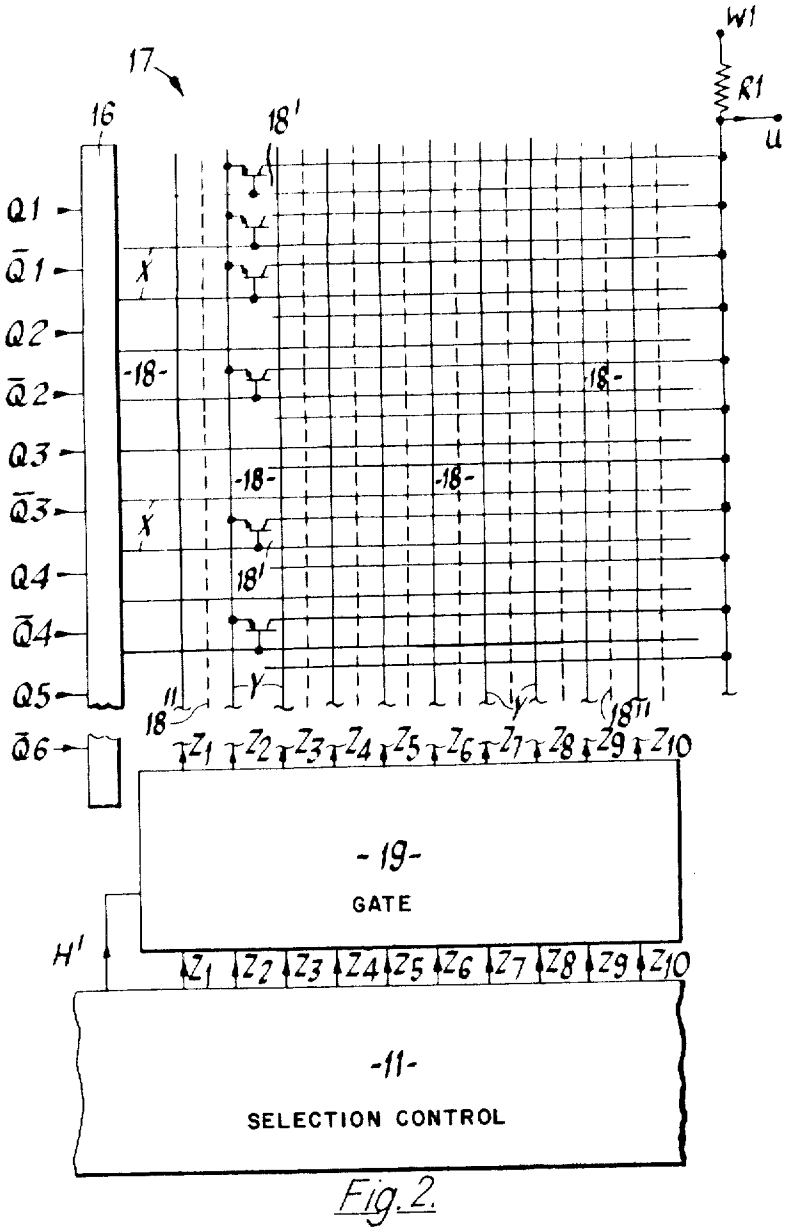
Figure 3:
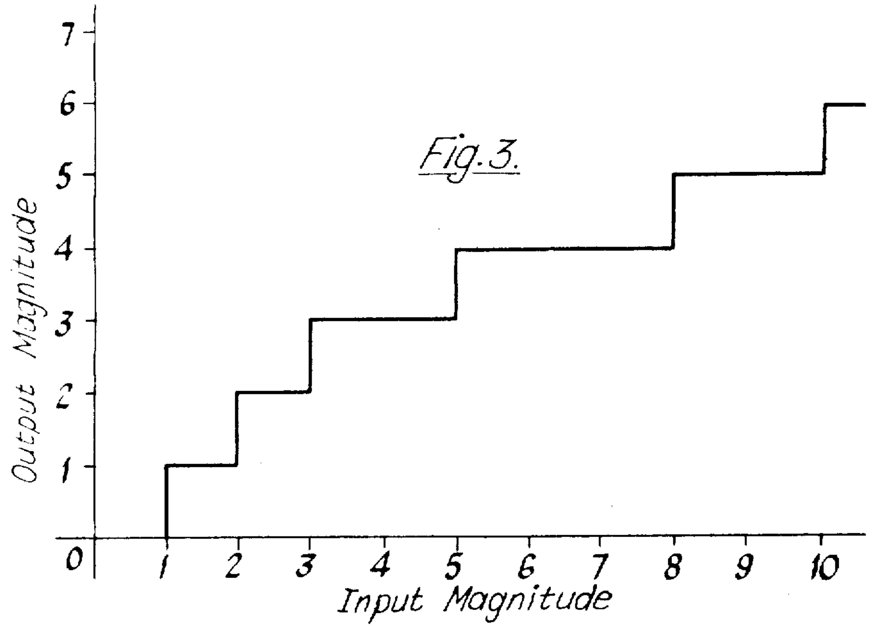
Figure 5:
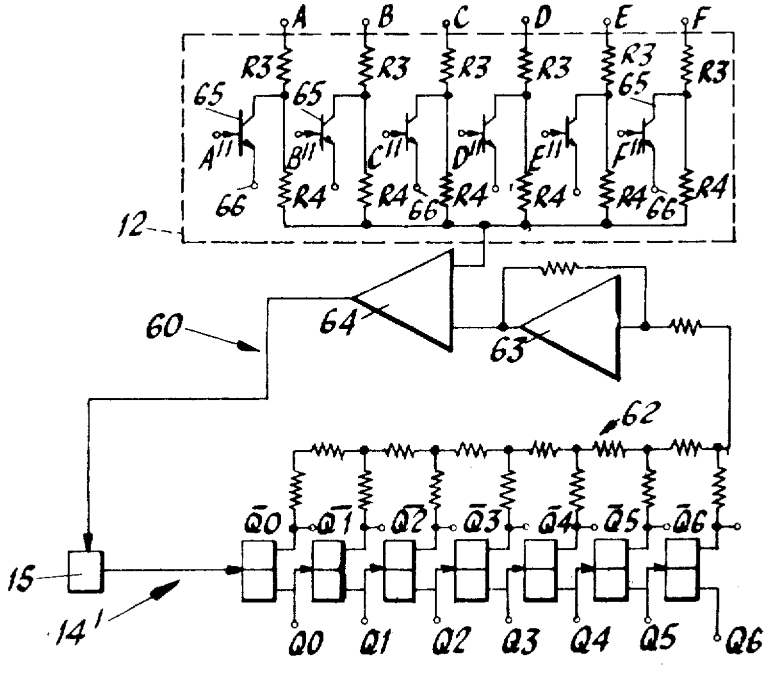
Figure 4:
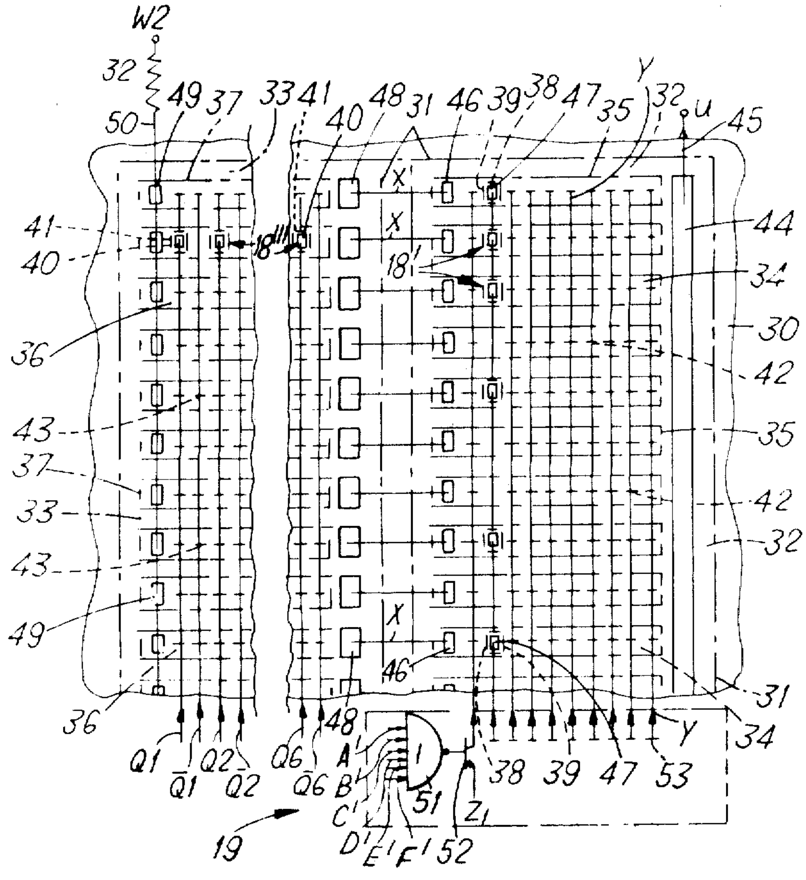

The present invention will now be described by way of example with reference to the accompanying drawings, in which FIG. 1 is a block circuit diagram of one embodiment of data processing apparatus according to the present invention for weighting the magnitudes of input information signals each in accordance with one of a plurality of different possible functions comprising empirically-derived expressions, FIG. 2 is a schematic diagram of part of the data processing apparatus, the illustrated part including a memory store, FIG. 3 is a graph of part of one function in accordance with which the data processing apparatus is capable of weighting the magnitude of an input information signal, FIG. 4 shows the arrangement of an array of cells of the memory store of FIG. 2, and the arrangement of associated decoding means, when provided in a semiconductor wafer body, and FIG. 5 is a circuit diagram of an analogue-to-digital converter comprising part of the data processing apparatus.

The illustrated data processing apparatus 10 weights the magnitudes of input information signals each in accordance with one of a plurality of different possible predetermined functions comprising empirically-derived expressions. The data processing apparatus receives input information signals on each of six input lines A, B, C, D, E and F from six associated sources (not shown). A line A . . . F is selected by control means 11 supplying a signal on a line G to gating means 12 connected to each line A . . . F, and the magnitude of the input information signal is stored in an initial memory store indicated generally at 13. The control means is provided to insure that each part of the apparatus performs its required operation in the appropriate sequence as hereinafter described. The control means is made up of conventional components, each operating in a conventional manner and which may be of the type shown in *Designing With TTl Integrated Circuits*, 1971, *McGraw Hill*, or *The Integrated Circuits Catalog For Design Engineers*, First Edition, Texas Instruments Inc. The magnitudes of the input information signals from the different sources vary slowly in an unpredictable manner with time, and at intervals the magnitudes of the input information signals from the different sources are stored in the initial memory store 13 under the control of the control means. Signals on a line H are supplied by the control means to the initial memory store. The input information signals stored in the initial memory store 13 are supplied individually under the control of the control means to a non-reversible, seven-bit first counter 14.

A clock pulse generator 15 is connected to the first counter 14, and clock pulses representative of units are accumulated in the first counter unless the pulses are inhibited by means (not shown). The passage of pulses to the first counter is such that the magnitude of pulses accumulated is equal to the magnitude of the input information signal supplied to the first counter.

The first counter 14 has 12 parallel outputs Q1, $\overline{Q1}$, Q2, $\overline{Q2}$, Q3, $\overline{Q3}$, Q4, $\overline{Q4}$, Q5, $\overline{Q5}$, Q6 and $\overline{Q6}$. All the outputs are shown in FIG. 2, but are represented by the single trunk line Q in FIG. 1. The outputs QO and $\overline{QO}$ of the least significant unit of the first counter are ignored. Thus, in response to the accumulation of each clock pulse unit in the first counter 14 there is produced a signal coded in binary form, and representative of the instantaneous value accumulated. Each coded signal has one part representative of the instantaneous value and another part comprising the complement of the said one part. Hence, in response to the accumulation of all the units of the magnitude of the selected input information signal in the first counter a train of signals in coded form is produced by the first counter. The sequential coded signals of the train, thus, represent the increasing instantaneous values accumulated in the first counter as the clock pulse units are supplied to the first counter.

The train of coded signals is supplied to decoding means 16 associated with a memory store 17. The memory store 17, as shown in FIG. 2, comprises a regular, rectangular array of cells 18 and two orthogonally-arranged series of parallel address lines. The series of address lines are designated X and Y, and each cell 18 is associated with an address line of each series. The decoding means 16 in response to the receipt of the train of coded signals, from the outputs Q1 . . . $\overline{Q6}$ of the first counter produces a train of uniformly spaced pulses, which pulses are supplied sequentially to the X address lines of the memory store 17. A pulse of the train of pulses is produced by the decoding means 16 in response to the receipt of each signal of the train of coded signals from the first counter 14. Thus, each different pulse of the train of pulses corresponds to a different instantaneous value of units in the first counter whilst the magnitude of the selected input information signal is being accumulated. The illustrated arrangement is such that each different X address line individually is connected to the decoding means 16 so that it receives only the pulse of a train of pulses produced when an associated instantaneous value is accumulated in the first counter, different pulses of a train of pulses being supplied to different X address lines. For convenience, only 10 of a much larger number of X address lines are shown in FIG. 2.

As shown in FIG. 2, a predetermined pattern of cells 18' within the memory store 17 each comprise an N-P-N transistor with its emitter connected to the Y address line associated with the cell, and with its base connected to the X address line associated with the cell. The collector is connected to the common output line U of the memory store 17. The collectors of each transistor 18' are also connected to a positive potential source, indicated at W1, via a resistor R1 and, normally, the emitters are held at a positive potential and the bases at a negative potential, to maintain the transistors in a switched OFF condition. Only the transistors 18' associated with the second Y address line of the memory store are shown in FIG. 2, the possible positions of transistors associated with the other Y address lines being indicated generally by broken lines 18''. The connections between these other transistors and the positive potential source W1, and the common output line U of the memory store, are not shown in the Figure.

Ten Y address lines are provided, and this series of address lines are connected to the control means 11 by gating means 19, in a manner described below in relation to FIG. 4. The gating means 19 is controlled by signals from the control means 11, inter alia receiving on a line H' a signal indicative of the selected line A . . . F supplying the input information signal currently stored in the first counter 14. In addition, the control means 11 has ten parallel outputs $Z_1 \ldots Z_{10}$ connected via the gating means 19 to corresponding Y address lines, with only one of these outputs of the control means 11 being connected to any one of the Y address lines. The arrangement is such that, upon the selection of one of the lines A . . . F, a corresponding one of the Y address lines is also selected by the control means 11. The control means causes the potential level of the selected Y address line, and hence also the potential level of the emitters of each transistor 18' associated with the selected Y address line, to be lowered. Thus, each of these transistors is ready to be switched ON when the potential level of its base is raised. Hence, each transistor 18' acts as a two-input AND gate. When a pulse is supplied by an X address line, the base potential of each transistor associated with the X address line is raised and such a transistor is switched ON if its emitter is connected to the selected y address line.

The switching ON of any transistor 18' causes the potential level at the common output line U to be lowered. This lowering of the potential level at the common output line U causes gating means (not shown) to permit a predetermined number of clock pulses from the clock pulse generator is to be accumulated in a non-reversible second counter 20, shown in FIG. 1. A predetermined number of clock pulses, or units, for example, two units, are accumulated in the second counter 20 for each pulse of the train of pulses from the decoding means 16 received by a transistor 18' of the selected Y address line.

An output information signal representative of the magnitude accumulated in the second counter 20 is supplied to a final memory, indicated generally at 21, under the control of the means 11, signals from the control means being supplied to the final memory 21 on a line J. An output information signal is then supplied from the final memory 21 to one of six output transducers (not shown) connected to the final memory via lines K, L, M, N, O and P. The output transducer to be supplied with an output information signal is selected by the control means 11 supplying a signal to the final memory store on the line J.

In FIG. 1 many of the lines between the different parts of the data processing apparatus are shown as single lines for convenience, whereas these lines may comprise trunks each with a plurality of individual lines.

The data processing apparatus according to the present invention essentially comprises the following parts, the first counter 14, the memory store 17 and the second counter 20 together with the control means 11 controlling these parts.

In the part of the pattern of predetermined cells 18' shown in FIG. 2, transistors are omitted at the fourth, sixth, seventh, ninth etc., cell positions associated with the second Y address line. An example of the determination of the magnitude stored in the second counter 20 by the memory store 17, when the second Y address line is selected by the control means 11, is now given. An input information signal having a magnitude of 10, with a train of pulses supplied sequentially to the illustrated, first 10 X address lines, causes the magnitude stored in the second counter to be six times the predetermined number of units, there being six transistors 18' switched ON. The adjacent transistors at the first, second, and third positions of the selected second Y address line together cause the potential at the common output line U of the memory store to be lowered for a period three times longer than caused individually by the transistors at the fifth, eighth and 10th positions, when pulses are passed to each of these transistors, the latter three transistors occupying cells in the selected Y address line which are not adjacent to other transistors. With an input information signal of a magnitude of eight or nine, the magnitude stored in the second counter is five times the predetermined number of units, there being only the first five transistors switched ON; with an input information signal of a magnitude of five, six or seven, the magnitude stored in the second counter is four times the predetermined number of units; etc. Thus, the magnitude stored in the second counter comprises the magnitude of the input information signal weighted in accordance with a function associated with the second Y address line selected by the control means 11.

Hence, the part of the function associated with the illustrated part of the second Y address line, and when one clock pulse is accumulated in the second counter for each pulse received by a transistor of the selected Y address line, is represented by the stepped waveform of FIG. 3. The ordinate value at any point of the graph comprises the weighted value of an input information signal of a magnitude of the abscissa value at the point, the weighting being in accordance with the function. The stepped waveform is against time, and has a plurality of uniformly spaced points in relation to the abscissa, or time axis, and each point corresponds to a pulse of the train of pulses supplied sequentially to the X series of address lines. At some of the spaced points the waveform has unit changes in value in relation to the ordinate axis in order to represent the function.

Thus, output pulses are obtained from the memory store 17 in response to each pulse of the train of pulses supplied to the X series of address lines corresponding to a spaced point of the stepped waveform of FIG. 3 at which a unit change in value in relation to the ordinate axis occurs.

Ten different desired functions are associated with the ten Y address lines, the pattern of transistors 18' within the memory store 17 being such that the different desired functions are associated with the different Y address lines. The different functions are associated with input information signals from different ones of the lines A . . . F. Thus, the control means 11 when selecting a line A . . . F to be connected to the data processing apparatus, and simultaneously selecting a Y address line, also selects the appropriate function in order to obtain the desired weighting of the magnitude of the instantaneous input information signal from the source associated with the selected line A . . . F.

The data processing apparatus may be shared between the sources associated with the different lines A . . . F because the counting rate of the first counter 14 is much faster than the rates of variation of the magnitudes of the input information signals from the sources. In one example of the possible application of data processing apparatus according to the present invention, and in which the maximum possible magnitude of the different input information signals is one hundred, a seven-bit train of coded signals from the first counter representing such a magnitude is produced in less than one milli-second when a clock pulse generator 15 having an output of a frequency of 200 KiloHertz is employed. An input information signal of such a magnitude is operated upon within the data processing apparatus to an accuracy of 1%, which accuracy is sufficient for many applications of the apparatus.

The function to be operated upon input information signals from a particular source may be changed by causing a different Y address line to be selected. Thus, the different Y address lines may be selected automatically by the control means 11 upon a certain predetermined condition being fulfilled, for example, upon the magnitude of the input information signal reaching a predetermined value.

The arrangement of the data processing apparatus may be varied from that described above in various ways. Thus, each pulse of a train of pulses supplied to the series of X address lines may represent more than one unit of the magnitude of an input information signal accumulated in the first counter. In addition, two or more pulses may be produced by the decoding means 16 in response to at least some of the signals in coded form from the first counter, and/or the decoding means 16 may be arranged to supply a pulse to more than one X address line in response to the receipt of at least some of the signals in the coded form from the first counter.

Further, the signals from the first counter may not be in coded form. Thus, the decoding means 16 may be omitted, a train of uncoded pulses from the first counter being supplied directly and sequentially to the series of X address lines from the first counter.

The arrangement also may be such that, instead of the least significant unit of the magnitude of the input information signal accumulated in the first counter not being operated upon, either a plurality of such least significant units are not operated upon, or all the units are operated upon, within the data processing apparatus.

If the function to be operated upon input information signals from any one of the sources associated with the lines A . . . F does not either increase or decrease continuously, then detection means, indicated in broken line form at 22, must be provided. The detection means 22, which is connected to the first counter 14 by a line Q' and receives control signals on a line Z', is required to produce a signal in response to the detection of an instantaneous value accumulated within the first counter corresponding to the spaced point on the abscissa of the selected function at which the slope of the function changes sense. The second counter 20, which now is required to have a reversible action, has the direction of its counting action reversed in response to such a signal being produced by the detection means 22.

The memory store 17, described above with reference to FIG. 2, easily may be fabricated by a known method in a monolithic semiconductor wafer body. The arrangement of part of the memory store, and part of the decoding means 16 associated with the X series of address lines of the memory store, is shown schematically in FIG. 4. The semiconductor body 30 initially comprises an epitaxial layer of N conductivity type on a substrate (not shown) of P conductivity type. P-type isolating barriers are diffused through the epitaxial layer to the substrate forming P-N junctions 31 indicated in chain dotted form. The isolating barriers define a common collector region 32 for the array of cells of the memory store and a common collector region 33 for the decoding means 16. A plurality of P-type common base regions are then formed by diffusion within each common collector region 32 and 33, the common base regions 34 of the array of cells of the memory store being defined by P-N junctions indicated at 35 in chain dotted form, and the common base regions 36 of the decoding means 16 being defined by P-N junctions indicated at 37 in chain dotted form. Only ten of a much larger number of common base regions 34 and 36 are shown in each common collector region in FIG. 4. The base regions have an elongated shape, the longitudinal axes of the base regions within each common collector region 32 or 33 extending parallel to each other.

A plurality of N+ type emitters then are formed by diffusion, the emitters 38 of the array of cells of the memory store being defined by P-N junctions 39 indicated in broken line form, and the emitters 40 of the decoding means 16 being defined by P-N junctions 41 also indicated in broken line form. The emitters 38 and 40 are formed at a plurality of predetermined positions along the longitudinal axes of the common base regions 34 and 36, there being fewer emitters then predetermined positions within each common base region. Each emitter 38 or 40 effectively completes a transistor 18' or 18''' at the predetermined position at which it is provided, for convenience, only the emitters associated with the second predetermined position in each common base region 34 of the array of cells of the memory store, and only some of the emitters of the second common base region 36 of the decoding means 16 being shown in FIG. 4. The transistors 18''' are provided in the decoding means 16. The second predetermined position of each common base region 34 of the array of cells, and the predetermined positions of the second common base region 36 of the decoding means 16, not provided with an emitter are left blank. Other predetermined positions of each common base region 34 or 36, and which may be provided with an emitter 38 or 40, respectively, are each indicated by a component dash of a broken line 42 or 43. The illustrated emitters 38 of the array of cells of the memory store complete the illustrated part of the predetermined pattern of cells 18', each cell of the predetermined pattern comprising an effectively-completed transistor. The pattern of emitters 38, and hence of the effectively-completed transistors 18', is such that the array of cells generate the desired functions. Similarly, the predetermined arrangement of the emitters 40 within each common base region 36 of the decoding means 16 completes transistors 18'''. The emitters 38 and 40 are provided by employing an emitter diffusion mask of the appropriate shape. The emitters 38 of the array of cells are arranged to provide the particular functions required for the application of the data processing apparatus, and the emitters 40 of the decoding means 16 are arranged to provide the required decoding action.

A layer of silicon oxide (not shown) covers the epitaxial layer of the semiconductor body and, in particular, covers each portion of a P-N junction 31, 35, 37, 39 or 41 which extends to the surface of the epitaxial layer. Apertures (not shown) are formed in the silicon oxide layer to enable contacts to be provided on the common collector regions 32 and 33, the common base regions 34 and 36 and the emitters 38 and 40. Ohmic contacts to these parts of the semiconductor body are made by depositing a layer of aluminum over the silicon oxide layer, the aluminum within the apertures of the silicon oxide layer forming the desired contacts after being sintered. Before the sintering step, the aluminum layer is etched to define the contacts and also to define electrical interconnections which extend on the silicon oxide layer between the contacts. In FIG. 4 the contacts are shown in continuous line form, and the electrical interconnections are indicated as continuous lines.

Thus, for the array of cells of the memory store, the common collector region 32 is provided with an elongated contact 44 which extends transversely to each common base region 34. The collector contact 44 is connected to the common output line U of the memory store by an electrical interconnection 45. Each common base region 34 has a contact 46 remote from the collector contact 44, and each emitter 38 of the predetermined pattern of cells 18' of the memory store has a contact 47. Different Y address lines, comprising electrical interconnections on the silicon oxide layer, are connected to different emitters 38 of each common base region 34, with corresponding emitters of each common base region being connected to the same Y address line.

In relation to the description of the decoding means 16 the outputs of the first counter 14 supplying the complementary part of each coded signal will be referred to as complement outputs. In the decoding means 16 the common collector region 33 is provided with a plurality of collector contacts 48, a collector contact 48 being adjacent to an end of each common base region 36, different collector contacts being associated with different common base regions. Different base contacts 46 of the array of cells of the memory store are connected by different electrical interconnections, comprising the X series of address lines, to corresponding collector contacts 48 of the decoding means, with only one collector contact 48 of the decoding means being connected to any one of the X address lines. Each common base region 36 has a contact 49 remote from the collector contact 48 associated with the common base region, and each base contact 49 is connected by a common electrical interconnection 50 to a positive potential source W2, via a resistor R2. Different emitters 41 of each common base region 36 are connected to different outputs of the plurality of parallel outputs and their complements Q1 . . . $\overline{Q6}$ of the first counter 14. The outputs of the first counter also comprise electrical interconnections on the silicon oxide layer.

The predetermined arrangement of the emitters 40 within each common base region 36 of the decoding means 16, and hence the predetermined arrangement of effectively-completed transistors 18''' within the common base region, is such that the required decoding action is obtained. Normally each such transistor 18''' is switched ON, and the common collector contact 48 associated with each common base region is held at a negative potential level. In order to obtain a positive going pulse at a collector contact of the decoding means, to cause the transistors 18' connected to the associated X address line to be switched ON if also connected to the Y address line selected by the control means 11, it is necessary to cause all the transistors 18''' of the associated common base region 36 of the decoding means to be switched OFF. Each transistor is switched OFF when the potential level of the emitter is raised. The predetermined arrangement of transistors 18''' within each common base 36 is unique to that common base region. Because a binary coded signal from both the six outputs of the first counter and their complements Q1 . . . $\overline{Q6}$ are provided to the decoding means, six emitters or effectively-completed transistors 18''' are provided in each predetermined arrangement, one transistor being provided either for each output or its complement. Thus, only one pulse is supplied by the decoding means for each value instantaneously stored in the first counter, and in response to the receipt by the decoding means from the parallel outputs and their complements of the first counter of the signal coded in binary form representative of the instantaneous value. The pulse is supplied from the collector contact 48 associated with the only predetermined arrangement of six emitters 40 in which each emitter is held at a positive potential level by the signal in coded form from the outputs and their complements of the first counter.

Other parts of the data processing apparatus may be fabricated in the semiconductor body 30, for example, the control means 11, and also the gating means 19 which is connected between the control means and the Y series of address lines. In FIG. 4 part of the gating means 19 is shown in diagrammatic form, the illustrated part comprising a six-input NOR gate 51. The inputs of the NOR gate 51 are connected to the control means 11 via the trunk line H' so that a signal corresponding to the selected line A . . . F is supplied to the NOR gate. For convenience the six inputs of the NOR gate are designated A' . . . F'. The output is from a transistor 52 included within the NOR gate 51. The illustrated NOR gate 51 is associated with the first address line of the Y series of address lines. Nine other such NOR gates are associated with the other nine address lines of the series, different NOR gates being associated with different Y address lines, and each NOR gate being indicated by a component dash of a broken line 53. The collector of each transistor 52 of the NOR gates is connected directly to the associated Y address line and the emitter is connected directly to the corresponding one of the outputs $Z_1$ . . . $Z_{10}$ of the control means 11. Thus, the potential level of the emitters of a Y address line selected by the control means is lowered by switching ON the corresponding transistor 52 by the control means 11.

All the transistors 52 are in a condition ready to be switched ON when their base potentials are raised in response to signals being received by the NOR gates indicative of the line A . . . F selected by the control means 11. The control means 11 then causes the potential level of the selected output $Z_1$ . . . $Z_{10}$ to be lowered to switch ON on the corresponding transistor 52.

The input information signals to be operated upon by the data processing means may be initially of analogue form, an analogue-to-digital converter being provided. Such a converter 60 is shown in FIG. 5 and includes a seven-bit counter 14'. Clock pulses from the clock pulse generator 15 are accumulated in the counter 14', and a binary coded signal representative of the instantaneous value accumulated in the counter 14' is supplied by the complements $\overline{Q0}$, $\overline{Q1}$, $\overline{Q2}$, $\overline{Q3}$, $\overline{Q4}$, $\overline{Q5}$, and $\overline{Q6}$ of the outputs of the counter 14' to a binary resistor ladder network 62. The output of the ladder network is summed, and is amplified in a virtual earth amplifier 63. The output of the amplifier 63 is passed to a comparator 64 where it is compared with the magnitude of an analogue input information signal from one of the six sources and supplied on the selected line A . . . F. When the state of the counter 14' is such that the ladder generated voltage level and the voltage level of the analogue input information signal are the same, a signal is generated which inhibits clock pulses to the counter 14', leaving the counter 14' with a magnitude accumulated therein in digital form which is equal to the magnitude represented by the analogue input information signal. A train of signals coded in binary form, different signals being representative of the different instantaneous values in the counter whilst the magnitude is being accumulated therein, may be supplied on outputs Q1 . . . $\overline{Q6}$ to the decoding means 16 in the manner described above with reference to FIGS. 1 to 4. In such an arrangement the counter 14' comprises the first counter of the data processing apparatus. Alternatively, a signal representative of the magnitude of the input information signal in binary form is passed to the initial memory store 13 before being supplied to the first counter 14 of the data processing apparatus. The least significant unit of the accumulated value in the counter 14', supplied on outputs Q0 and $\overline{Q0}$, is ignored when the input information signal is operated upon within the data processing apparatus.

The complements of the train of signals in binary form and supplied to the decoding means may be generated in part of the data processing apparatus associated with the memory store 17.

The ratio values of the resistors of the ladder network 62 are of more importance than the absolute values of the resistors. Hence, the fabrication of the network 62 within a semiconductor body is facilitated. In addition, only a single component external of the semiconductor body is required to be included in the network, this component comprising a calibrating resistor.

The gating means 12 by which the line A . . . F is selected is also shown in detail in FIG. 5. The input information signals from each source are supplied to a resistor R3, and then either via another resistor R4 to the comparator 64, or via an associated transistor 65 to a point 66 comprising a point providing a reference potential for the virtual earth amplifier 63. The collector of each transistor 65 is connected to the associated resistor R3 and the emitter is connected to the point 66. The bases of the different transistors 65 are connected to different lines A'', B'', C'', D'', E'', and F'', from the control means 11, and indicated generally by the trunk line G in FIG. 1, each line A'' . . . F'' being connected individually to a corresponding transistor 65. The control means 11, thus, causes the selection of the line A . . . F to supply an input information signal the magnitude of which is to be accumulated in digital form in the counter 14'. The base potential of each transistor 65 normally is arranged to be such that the transistor is switched ON, the input information signal from the associated line A . . . F not being supplied to the comparator 64. However, the control means 11 selects a source by lowering the base potential of the associated transistor 65, causing the transistor to be switched OFF, and the input information signal from the line to be passed to the comparator 64.

The data processing apparatus may also be required to operate upon the input information signals by performing additions, subtractions, multiplications and differentiations with respect to time. These operations are obtained in known manner and will not be discussed in detail. Thus, the output of the second counter 20 may be passed to means (not shown) comprising part of an arithmetic unit, the latter performing the desired operations. Further, the analogue-to-digital converter, when provided, and as shown in FIG. 5, may comprise a virtual earth analogue input reference point, and so it is possible to use this reference point when operating upon the input information signals in a manner which does not require a high degree of accuracy. Hence, a differentiation operation on an input information signal may be obtained by providing a simple A.C. coupling between the selected line A . . . F and the virtual earth reference point 66. Input information signals which are not required to be weighted in accordance with a function by-pass, at least, the memory store 17. The control means 11 co-ordinates the activities of the different parts of such data processing apparatus, for example, the control means supplying signals on lines S and T, indicated in FIG. 1, to energise the different parts.

If some input information signals are required to be operated upon in accordance with an empirically-derived time-based function, this operation is performed by employing a section of the memory store 17 in the same manner as for the performing of an operation involving any other form of empirically-derived function.

Data processing apparatus according to the present invention is essentially simple in construction.

Each cell of the predetermined pattern of cells may comprise a bistable element, having a more complex structure than the transistor cell structure described above. Alternatively, each such cell may comprise only a diode, although the decoding means in such data processing apparatus will have a different form to that described above.

What I claim is:

1. Data processing apparatus for weighting an input information signal in accordance with a function representable by a stepped waveform in relation to time, the stepped waveform having a plurality of uniformly spaced points in relation to its time axis, and at least some of the spaced points having at least one unit change in value in relation to its other axis so as to represent the function, means for generating a train of uniformly spaced pulses, each pulse corresponding to one of the spaced points of the stepped waveform and also representing a unit of the magnitude of the input information signal, means for obtaining an output pulse for each unit change in value in response to each pulse of the train of pulses corresponding to a spaced point of the stepped waveform at which a unit change in value occurs, and means to accumulate the output pulses and provide an output signal corresponding to the input information signal weighted in accordance with said function.

2. Data processing apparatus as set forth in claim 1 wherein said means for obtaining an output pulse for each change in unit value comprises a memory store including an array of memory cells formed in a semiconductor body and having a common collector region, a different common base region for the cells associated with different address lines of one series of address lines, and an emitter for each cell of the predetermined pattern of cells within the memory store, different emitters within each common base region being connected to different address lines of an other series of address lines, corresponding emitters within the different common base regions being connected to the same address line, the different common base regions being connected to different address lines of said one series of address lines, and the common collector region being connected to a common output of the memory cells.

3. Apparatus as claimed in claim 2 including decoding means connected between the means for generating the train of pulses and the memory store, said generating means comprising a first counter for producing signals in coated form on a plurality of parallel outputs, the decoding means being provided in the semiconductor body and comprising a common collector region, a different common base region associated with different address lines of said one series of address lines, a plurality of predetermined positions for emitters within each common base region, a different predetermined arrangement of a plurality of emitters within different common base regions with fewer emitters than predetermined positions within each common base region, different predetermined positions within each common base region being associated with different outputs of the first counter, with corresponding predetermined positions within the different common base regions being associated with the same output, the predetermined arrangements of emitters within the common base regions being such that the desired train of pulses is produced by the decoding means in response to the receipt of a train of signals in coded form from the first counter, each signal in coded form causing the decoding means to produce at least one pulse of the train of pulses, and a different signal in coded form being supplied by the first counter to the decoding means in response to the accumulation in the first counter of at least one unit of the magnitude of an input information signal.

4. Apparatus as claimed in claim 3 in which the first counter produces signals coded in binary form, and each coded signal comprises one part representative of the instantaneous value accumulated in the counter and another part comprising the complement of said one part, and each different predetermined arrangement of emitters within the different common base regions of the decoding means is provided with the same number of emitters, with each emitter of each predetermined arrangement of emitters being arranged to receive an associated portion of one of the two constituent parts of each coded signal from the first counter.

5. Data processing apparatus for weighting an input information signal in accordance with a function representable by a stepped waveform in relation to time, the stepped waveform having a plurality of uniformly spaced points in relation to its time axis, and at the spaced points having unit changes in value in relation to its other axis so as to represent the function, comprising a memory store having an array of cells with a common output and two series of address lines, each cell being associated with an address line of each series, a first counter means for accumulating an input information signal and for producing in response to the accumulation of the input information signal a train of uniformly spaced pulses, different constituent pulses of the train of pulses being produced by said first counter means in response to the accumulation in the first counter of different units of the magnitude of the input information signal, means connecting said first counter to at least one corresponding address line of one series of address lines of the memory store to supply to said corresponding address line said constituent pulses, at least one address line receiving a pulse in response to the accumulation in the first counter of at least one unit of the magnitude of the input information signal, second counter means connected to the common output of the memory store, and control means for selecting at least one of the other series of address lines and a plurality of cells forming a predetermined pattern within the memory store, each such cell when associated with the address line of said other series of address lines selected by the control means and when having supplied thereto a pulse of a train of pulses produced by the accumulation of an input information signal in the first counter, having an output applied to the second counter for causing the magnitude of the count stored in the second counter to change by at least one unit, the predetermined pattern of the cells within the memory store being such that the magnitude of the count accumulated in the second counter corresponds to the magnitude of the input information signal weighted in accordance with the function, which function is associated with the selected address line of said other series of address lines.

6. Apparatus as claimed in claim 5 in which different address lines of said other series of address lines may be associated with different functions.

7. Apparatus as claimed in claim 5 in which the control means includes means to control the selection of one of a plurality of different sources of input information signals to be connected to the data processing apparatus.

8. Apparatus as claimed in claim 5 in which different functions are associated with input information signals from the same source, the control means being arranged to select a different function upon a predetermined condition being fulfilled.

9. Apparatus as claimed in claim 5 in which, in response to the accumulation in the first counter of each of at least some of the units of the magnitude of an input information signal, a pulse is supplied to more than one address line of said one series of address lines.

10. Apparatus as claimed in claim 5 in which the first counter produces signals in coded form, decoding means connected between the memory store and the first counter for supplying to said one series of address lines train of pulses in response to the receipt of a train of signals in coded form from the first counter, each signal in coded form causing the decoding means to produce at least one pulse of the train of pulses, and a different signal in coded form being supplied by the first counter to the decoding means in response to the accumulation in the first counter of at least one unit of the magnitude of an input information signal.

11. Apparatus as claimed in claim 5 in which each cell of the predetermined pattern of cells within the memory store comprises a transistor as a two-input AND gate.

12. Apparatus as claimed in claim 11 in which the base of each transistor is connected to the associated address line of said one series of address lines, the emitter is connected to the associated address line of said other series of address lines, and the collector is connected to the common output for the memory store.

13. Apparatus as claimed in claim 5 in which detection means is provided to produce a signal in response to the detection by the means of a value accumulated in the first counter corresponding to a spaced point on the selected function at which the slope of the function changes sense, and in which the second counter has a reversible action, the direction of the counting action of the second counter being reversed in response to a signal being produced by the detection means.

14. Apparatus as claimed in claim 5 in which an analogue-to-digital converter is provided to convert to digital form the input information signals from each source providing input information signals in analogue form.

15. Apparatus as claimed in claim 14 in which the analogue-to-digital converter includes a counter.

16. Apparatus as claimed in claim 15 in which the analogue-to-digital converter also includes a pulse generator arranged to drive the counter, a binary resistor ladder network to receive signals from the counter, each signal representing in binary form the instantaneous magnitude of the number of pulses accumulated in the counter, and a comparator to compare the ladder generated voltage level and the voltage level of the analogue input information signal from the selected source, the comparator being arranged to stop the counting action of the counter when the two voltage levels are equal.

17. Apparatus as claimed in claim 16 including a virtual earth amplifier connected between the ladder network and the comparator.

18. Data processing apparatus as claimed in claim 5 in which at least the array of cells of the memory store of the data processing apparatus comprises a semiconductor device formed in a semiconductor body, the memory store having a common collector region, a different common base region for the cells associated with different address lines of said one series of address lines, and an emitter for each cell of the predetermined pattern of cells within the memory store, different emitters within each common base region being connected to different address lines of said other series of address lines, with corresponding emitters within the different common base regions being connected to the same address line, the different common base regions being connected to different address lines of said one series of address lines, and the common collector region being connected to the common output of the memory store.

19. Apparatus as claimed in claim 18 including decoding means connected between the memory store and the first counter, said decoding means being formed in the semiconductor body and being arranged for supplying to said one series of address lines a train of pulses in response to the receipt of a train of signals in coded form from the first counter, each signal in coded form causing the decoding means to produce at least one pulse of the train of pulses, and a different signal in coded form being supplied by the first counter to the decoding means in response to accumulation in the first counter of at least one unit of the magnitude of an information signal.

20. Apparatus as claimed in claim 19 in which said decoding means is connected between the first counter and the memory store, the first counter being arranged for producing signals in coded form on a plurality of parallel outputs, the decoding means formed in the semiconductor body and comprising a common collector region, a different common base region associated with different address lines of said one series of address lines, a plurality of predetermined positions for emitters within each common base region and within different common base regions a different predetermined arrangement of a plurality of emitters, with fewer emitters than predetermined positions within each common base region, different predetermined positions within each common base region being associated with different outputs of the first counter, with corresponding predetermined positions within the different common base regions being associated with the same output, the predetermined arrangements of emitters within the common base regions being such that the desired train of pulses is produced by the decoding means in response to the receipt of a train of signals in coded form from the first counter, each signal in coded form causing the decoding means to produce at least one pulse of the train of pulses, and a different signal in coded form being supplied by the first counter to the decoding means in response to the accumulation in the first counter of at least one unit of the magnitude of an input information signal.

21. A device as claimed in claim 20 in which the first counter produces signals coded in binary form, and each coded signal comprises one part representative of the instantaneous value accumulated in the counter and another part comprising the complement of said one part, and each different predetermined arrangement of emitters within the different common base regions of the decoding means is provided with the same number of emitters, with each emitter of each predetermined arrangement of emitters being arranged to receive an associated portion of one of the two constituent parts of each coded signal from the first counter.

* * * * *